(No Model.)
W. GRISCOM.
BEARING FOR ROLLS OF ROLLER MILLS.
No. 550,223. Patented Nov. 19, 1895.
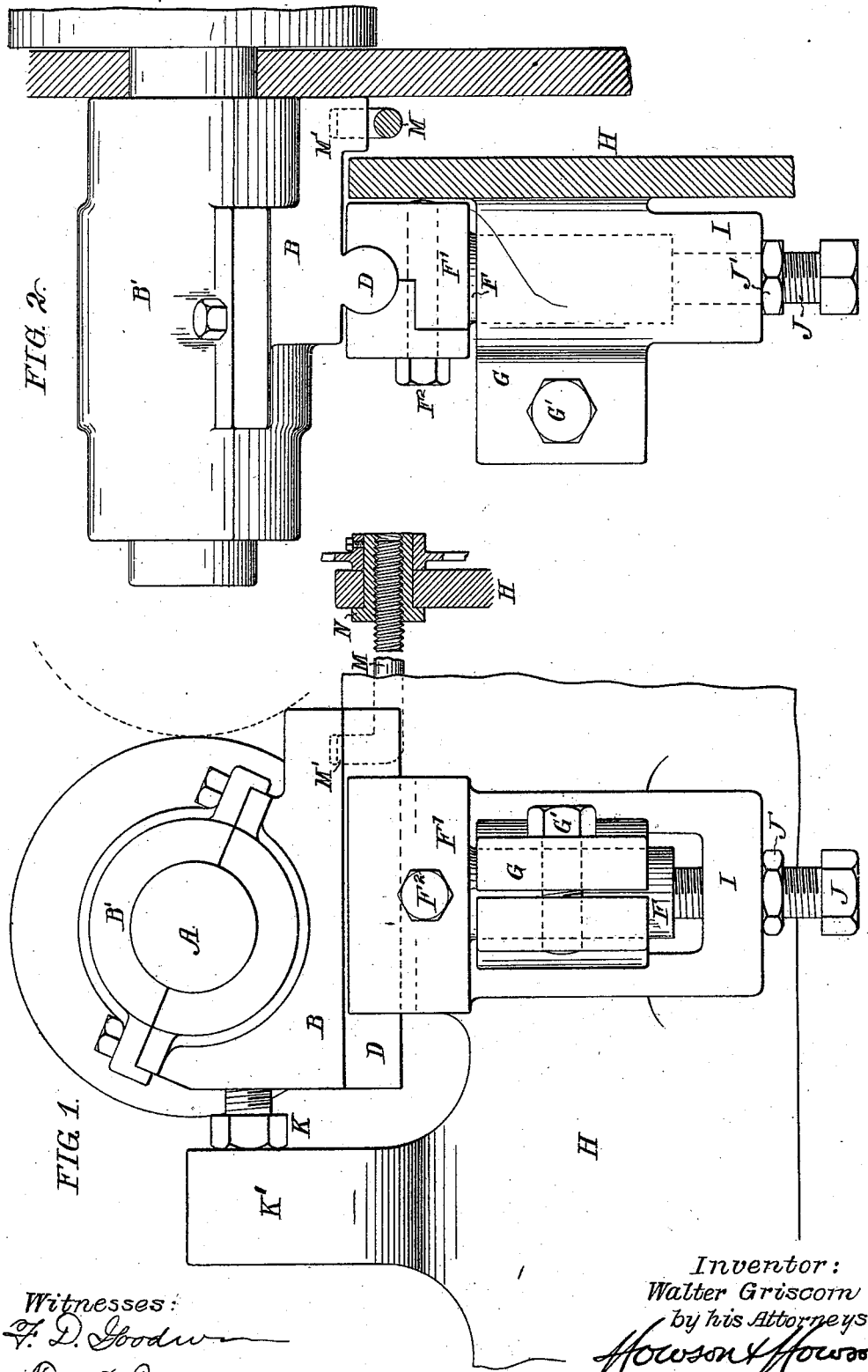
Witnesses:
F. D. Goodw—
Fred C. Benner
Inventor:
Walter Griscom
by his Attorneys
Howson & Howson

UNITED STATES PATENT OFFICE.

WALTER GRISCOM, OF PHILADELPHIA, PENNSYLVANIA.

BEARING FOR ROLLS OF ROLLER-MILLS.

SPECIFICATION forming part of Letters Patent No. 550,223, dated November 19, 1895.

Application filed October 24, 1894. Serial No. 526,834. (No model.)

*To all whom it may concern:*

Be it known that I, WALTER GRISCOM, a citizen of the United States, residing in Philadelphia, Pennsylvania, have invented certain Improvements in Bearings for Rolls of Roller-Mills, of which the following is a specification.

My invention relates to a bearing for the journal of the fixed roll of a roller-mill, the object of my invention being to so construct such bearing as to provide for direct vertical and horizontal adjustment and also for vertical and horizontal angular adjustment—that is to say, change of angle of the bearing in both a vertical and horizontal plane, so that the bearing may accurately accommodate itself to the journal and thus prevent binding and heating of the roll shaft or bearing. This object I attain in the manner hereinafter set forth, reference being had to the accompanying drawings, in which—

Figure 1 is a side view of a bearing constructed in accordance with my invention, and Fig. 2 is an end view of the same with part of the roll and with a portion of the box or casing of the mill shown in section.

A represents the shaft or journal of the fixed roll of the mill—that is to say, the roll which is adapted to bearings on the fixed frame in contradistinction to the movable roll whose journals are adapted to bearings in a spring-pressed frame or lever. The journal A has its bearing in a box B, provided with the usual detachable cap B', and said box has upon the under side a rounded rib D, which extends transversely to the axis of the roll, and is adapted to a recess formed in the separable head F' of a vertical stem F, said stem with its head constituting a carrier for the bearing-box and being adapted to a split lug G, which projects from the side frame H of the mill and has a depending yoke I with a threaded opening formed in it for the reception of a set-screw J, which bears upon the lower end of the stem F and is provided with a lock-nut J'.

The split lug G is provided with a tightening-screw G' and the two parts of the separable head F' of the stem F are secured together by a bolt F² or by a series of bolts, if desired.

Projecting from the box B is a set-screw K, the head of which bears against a lug K', projecting outwardly from the side frame H of the machine, and engaging with a vertical opening in the under side of said box B is the upwardly-projecting hooked end M' of an adjusting-screw stem M, the threaded portion of which is adapted to a nut N, confined to the end portion of the frame H, so as to be free to turn thereon. Hence when said nut is turned the bearing-box B can be moved either forward or backward in a horizontal plane and can be locked in position by so adjusting the set-screw K that its head bears firmly against the projecting lug K'. When so adjusted, the screw K prevents any motion of the box due to looseness of fit of the screw M, and also relieves said screw and its nut from strain due to pressure upon the roll, as it prevents any movement of the roll away from the opposing roll, it being understood that the latter occupies the position represented by dotted lines in Fig. 1.

Vertical adjustment of the bearing can be effected by manipulating the set-screw J after first loosening the split lug G, so as to permit the stem F to move vertically through the same, said stem being secured in position after adjustment by again tightening the lug.

Horizontal angular adjustment of the bearing is permitted by the turning of the stem F in the lug G and vertical angular adjustment by the movement of the rounded lug D in the head of the stem F. When the bearing has been properly adjusted, the lug is securely held by tightening the opposite portions of the head upon the lug by means of the screw F².

All needed adjustments of the bearing can thus be readily effected.

Having thus described my invention, I claim and desire to secure by Letters Patent—

1. The combination of the bearing box for the roll journal, a vertically adjustable carrier for said box, and an adjusting screw stem for effecting the horizontal sliding of the box in the carrier, said adjusting screw stem being carried by the fixed frame but offering no resistance to vertical movement of the box and its carrier, substantially as specified.

2. The combination of the bearing box having on the under side a rounded rib, a carrier located beneath the bearing and having a recess in which said rib can both turn and slide, the walls of said recess extending above the center of and engaging the rib, and means for effecting the sliding adjustment of the box in said carrier, substantially as specified.

3. The combination of the bearing box having a rounded rib on the under side, a carrier located beneath the box and free to turn and slide, said carrier having a recess therein the walls thereof extending above the center of and engaging the rib so that the said rib can both turn and slide in a direction at right angles to the turning and sliding movement of the carrier, means for vertically adjusting said carrier, and devices for effecting sliding movement of the box in the carrier, substantially as specified.

4. The combination of the bearing box having a rounded rib on the under side, a two-part carrier having a recess in which said rib can both turn and slide, means for effecting such sliding adjustment, and means for clamping the two parts of the carrier upon the rib so as to lock the same, substantially as specified.

5. The combination of the bearing box, the carrier in which said box can slide, the fixed frame having a projecting lug, an adjusting screw stem for the box, and a locking screw interposed between the box and the lug on the fixed frame, substantially as specified.

6. The combination of the bearing box, the carrier in which said box can slide, means for vertically adjusting said carrier, and a screw stem having an upwardly hooked end adapted to a vertical opening in the box so as to effect the sliding of the same in either direction, without interference with the vertical movement, substantially as specified.

7. The combination of the fixed frame, the bearing box having a rounded rib on the under side, a split carrier having a recess in which said rib can both turn and slide, a split lug in which the stem of the carrier can both turn and vertically slide, clamping devices for the split lug and carrier, means for effecting the vertical adjustment of the carrier and the sliding adjustment of the bearing box therein, and a set screw having a bearing on the fixed frame and serving to lock the bearing box in position after adjustment, substantially as specified.

In testimony whereof I have signed my name to this specification in the presence of two subscribing witnesses.

WALTER GRISCOM.

Witnesses:
   JOSEPH H. KLEIN,
   FRANK E. BECHTOLD.